US009226353B2

(12) United States Patent
Esaki et al.

(10) Patent No.: US 9,226,353 B2
(45) Date of Patent: Dec. 29, 2015

(54) LIGHTING DEVICE FOR SEMICONDUCTOR LIGHT EMITTING ELEMENTS AND ILLUMINATION APPARATUS INCLUDING SAME

(75) Inventors: Sana Esaki, Ibaraki (JP); Akinori Hiramatu, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 84 days.

(21) Appl. No.: 13/368,722

(22) Filed: Feb. 8, 2012

(65) Prior Publication Data

US 2012/0200231 A1 Aug. 9, 2012

(30) Foreign Application Priority Data

Feb. 9, 2011 (JP) ................................. 2011-025813

(51) Int. Cl.
*H05B 37/02* (2006.01)
*H05B 33/08* (2006.01)

(52) U.S. Cl.
CPC .......... *H05B 33/0818* (2013.01); *H05B 33/086* (2013.01); *H05B 33/0857* (2013.01); *Y02B 20/346* (2013.01)

(58) Field of Classification Search
CPC . H05B 37/02; H05B 37/0815; H05B 37/0845
USPC ............ 315/210, 291, 185 R, 192, 193, 246, 315/186, 189, 191, 307, 250
See application file for complete search history.

(56) References Cited

U.S. PATENT DOCUMENTS

| 5,803,579 | A | 9/1998 | Turnbull et al. |
| 7,423,387 | B2 * | 9/2008 | Robinson et al. ............. 315/291 |
| 7,482,760 | B2 * | 1/2009 | Jungwirth et al. ........ 315/185 R |

(Continued)

FOREIGN PATENT DOCUMENTS

| EP | 2004/057921 | 7/2004 |
| EP | 2006/015476 | 2/2006 |
| JP | 2000-173304 | 6/2000 |

(Continued)

OTHER PUBLICATIONS

An office action for Chinese Patent Application No. 201010118931.3 dated Nov. 16, 2011 and English translation thereof.

(Continued)

*Primary Examiner* — Alexander H Taningco
*Assistant Examiner* — David Lotter
(74) *Attorney, Agent, or Firm* — Bacon & Thomas, PLLC

(57) ABSTRACT

A lighting device includes a first and a second gate circuit having a first input to which a high frequency square wave signal generated from a high frequency oscillation circuit is inputted and a second input to which a first low frequency square wave signal is inputted; and a second gate circuit having a first input to which the high frequency square wave signal is inputted and a second input to which a second low frequency square wave signal is inputted. Each of the first and the second low frequency square wave signal has a frequency lower than that of the high frequency square wave signal, and the first and the second low frequency square wave signal determine whether the high frequency square wave signal is supplied, as on/off switching signals, to the first and the second switching power supply circuit, respectively.

4 Claims, 5 Drawing Sheets

(56) References Cited

U.S. PATENT DOCUMENTS

| | | | |
|---|---|---|---|
| 8,674,610 B2* | 3/2014 | Briggs | 315/192 |
| 2008/0252197 A1* | 10/2008 | Li et al. | 313/502 |

FOREIGN PATENT DOCUMENTS

| | | |
|---|---|---|
| JP | 2002-203988 | 7/2002 |
| JP | 2006-202494 | 8/2006 |
| JP | 2007-189004 A | 7/2007 |

OTHER PUBLICATIONS

The extended European search report dated May 25, 2012.

Japanese Office Action issued on Sep. 30, 2014 in a corresponding Japanese application No. 2011-025813 and the English summary thereof.

Office Action dated Jul. 24, 2015 issued in corresponding European Patent Application No. 12000702.6.

* cited by examiner

LIGHTING DEVICE FOR SEMICONDUCTOR LIGHT EMITTING ELEMENTS AND ILLUMINATION APPARATUS INCLUDING SAME

FIELD OF THE INVENTION

The present invention relates to a lighting device for semiconductor light emitting elements such as light emitting diodes (LEDs) and an illumination apparatus including same.

BACKGROUND OF THE INVENTION

Conventionally, Japanese Patent Application Publication No. 2006-202494 (JP2006-202494 hereinafter) (see FIG. 21, Paragraphs [0108] and [0111]) discloses an LED color-adjusting/dimming lighting device capable of varying a color temperature and brightness of white light by combining two types of LEDs having complementary colors, e.g., blue-green LEDs and brown LEDs, and operating a first lighting circuit allowing a predetermined current to flow in an LED series circuit of a first luminous color and a second lighting circuit allowing a predetermined current to flow in an LED series circuit of a second luminous color with independent duty cycle control.

Japanese Patent Application Publication No. 2002-203988 (JP2002-203988 hereinafter) (see FIGS. 1 to 4) discloses a lighting device of semiconductor light emitting elements, capable of controlling an average current flowing in an LED series circuit by intermittently performing an oscillation operation of a switching power supply circuit for driving the LED series circuit.

Japanese Patent Application Publication No. 2000-173304 (see FIGS. 11 and 12, Paragraph [0086]) discloses a configuration in which a logical-product of a high frequency square wave signal and a low frequency square wave signal is carried out by an AND circuit and an output signal of the AND circuit is supplied to a control electrode of a switching element which controls a current flowing in an LED series circuit. Such configuration relates to an LED marker lamp which has a dimming function and a blinking function, but does not have a color-adjusting function.

In JP2006-202494, the first lighting circuit allowing a predetermined current to flow in the LED series circuit of the first luminous color and the second lighting circuit allowing a predetermined current to flow in the LED series circuit of the second luminous color are configured as constant current circuits using bipolar transistors, whose circuit loss for a constant current control is high and efficiency is low.

In case of using the switching power supply circuit as disclosed in JP2002-203988, it may be possible to improve the efficiency. However, controlling two types of LED series circuits is not taken into consideration. The switching power supply circuit in JP2002-203988 includes a high frequency oscillation circuit which controls a switching element to be turned on at a predetermined frequency, a peak current control circuit which controls the switching element to be turned off when the current flowing in the switching element reaches a predetermined value, and an oscillation control circuit which intermittently stops the oscillation of the high frequency oscillation circuit when the average current flowing in the LED series circuit is higher than a dimming target value. As such, the configuration is complicated and since the oscillation of the high frequency oscillation circuit is intermittently stopped, one high frequency oscillation circuit cannot be commonly used to control two types of LED series circuits.

Accordingly, in case of directly applying the technology in JP2002-203988 to control of two types of LED series circuits having different luminous colors as disclosed in, e.g., JP2002-203988, the configuration is complicated, which causes an increase in cost.

SUMMARY OF THE INVENTION

In view of the above, the present invention provides a lighting device of semiconductor light emitting elements capable of controlling a color temperature with a simple configuration in which two types of switching power supply circuits for driving two types of semiconductor light emitting elements having different luminous colors can be controlled by using a common high frequency oscillation circuit.

In accordance with an aspect of the present invention, there is provided a lighting device including: a first and a second switching power supply circuit which are connected in parallel to an input DC power supply to drive a first and a second semiconductor light emitting element having different color temperatures, respectively; a high frequency oscillation circuit which generates a high frequency square wave signal serving as an on/off switching signal of each of the first and the second switching power supply circuit; a first gate circuit connected to the first switching power supply circuit having a first input to which the high frequency square wave signal is inputted and a second input to which a first low frequency square wave signal is inputted; and a second gate circuit connected to the second switching power supply circuit having a first input to which the high frequency square wave signal is inputted and a second input to which a second low frequency square wave signal is inputted.

Further, each of the first and the second low frequency square wave signal has a frequency lower than that of the high frequency square wave signal, and the first and the second low frequency square wave signal determine whether the high frequency square wave signal is supplied to the first and the second switching power supply circuit, respectively.

Further, the high frequency square wave signal generated from the high frequency oscillation circuit may include a first and a second high frequency square wave signal having different on/off duties; a load voltage of the second semiconductor light emitting element may be greater than that of the first semiconductor light emitting element; and an ON pulse width of the second switching power supply circuit may be greater than an ON pulse width of the first switching power supply circuit.

Further, the lighting device described above may further include an integrated circuit in which four or six logic circuits are embedded in one chip in which two of logic circuits serve as the first and second gate circuits, and the other logic circuits serve to generate the high and low frequency square wave signals.

In accordance with another aspect of the present invention, there is provided an illumination apparatus including: the lighting device described above, and the first and the second semiconductor light emitting element which are driven by the lighting device.

In accordance with the present invention, a high frequency square wave signal serving as an on/off switching signal of the first and the second switching power supply circuit for driving the first and the second semiconductor light emitting element having different color temperatures respectively is supplied from a common high frequency oscillation circuit via a first and a second gate circuit. Accordingly, it is possible to control the color temperature with a simple configuration by controlling the duties of the low frequency square wave signals applied to the first and second gate circuits.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Hereinafter, embodiments of the present invention will be described in detail with reference to the accompanying drawings which form a part hereof.

(First Embodiment)

Figure 1:
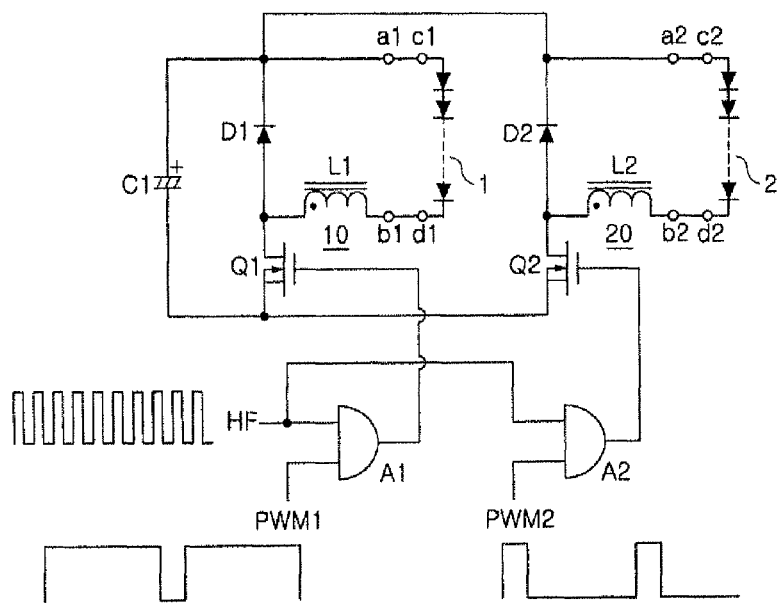
FIG. 1 is a circuit diagram in accordance with a first embodiment of the present invention.

FIG. 1 is a circuit diagram of an LED color-adjusting/dimming lighting device in accordance with a first embodiment of the present invention. Connected in parallel to a smoothing capacitor C1 serving as an input DC power supply are a first step-down chopper circuit 10 including a switching element Q1, an inductor L1 and a flyback diode D1, and a second step-down chopper circuit 20 including a switching element Q2, an inductor L2 and a flyback diode D2.

Hereinafter, a configuration of the first step-down chopper circuit 10 will be described. The second step-down chopper circuit 20 also has the same configuration as the first step-down chopper circuit 10.

The switching element Q1 of the first step-down chopper circuit 10 includes, e.g., a MOSFET having a source electrode connected to a cathode of the smoothing capacitor C1, and a drain electrode connected to an anode of the diode D1 and one terminal of the inductor L1. An anode of the smoothing capacitor C1 is connected to a cathode of the diode D1 and also connected to an output terminal a1. The other terminal of the inductor L1 is connected to an output terminal b1. A smoothing capacitor (not shown) for smoothing an output voltage may be connected between the output terminal a1 and the output terminal b1.

A first semiconductor light emitting element 1 including a series circuit of light emitting diodes (LEDs) is connected between a load terminal c1 and a load terminal d1. Although the first semiconductor light emitting element 1 includes LEDs connected in series, it may include LEDs connected in parallel as well as in series. Each of connections between the output terminal a1 and the load terminal c1 and between the output terminal b1 and the load terminal d1 is made through a lead wire 8 connecting a power supply unit 5 and an LED module 4 as will be described later and shown in FIG. 6.

An operation of the first step-down chopper circuit 10 will be described. When the switching element Q1 is turned on, a current flows in a path including the anode of the smoothing capacitor C1→the semiconductor light emitting element 1→the inductor L1→the switching element Q1→the cathode of the smoothing capacitor C1, such that energy is accumulated in the inductor L1. When the switching element Q1 is turned off, the accumulated energy in the inductor L1 produces a flyback current flowing through a path including the inductor L1→the flyback diode D1→the semiconductor light emitting element 1→the inductor L1, so that the energy accumulated in the inductor L1 is discharged. The second step-down chopper circuit 20 also performs the same operation as the first step-down chopper circuit 10.

The first semiconductor light emitting element 1 connected to the output of the first step-down chopper circuit 10 has a luminous color of a cold color (e.g., blue or green). Further, a second semiconductor light emitting element 2 connected to the output of the second step-down chopper circuit 20 has a luminous color of a warm color (e.g., brown). There is no need for each of the semiconductor light emitting elements 1 and 2 to be a series circuit of LEDs having a single color. The semiconductor light emitting elements 1 and 2 may be configured by appropriately combining LEDs having different luminous colors such that the overall mixed colors of the semiconductor light emitting elements 1 and 2 are cold white color (high color temperature) and a warm white color (low color temperature), respectively.

Next, a control circuit for controlling the switching elements Q1 and Q2 of the first and second step-down chopper circuits 10 and 20 will be described. Output signals of AND circuits A1 and A2 are respectively inputted to control electrodes of the switching elements Q1 and Q2. A high frequency square wave signal HF is inputted to one input of each of the AND circuits A1 and A2. A low frequency square wave signal PWM1 is inputted to the other input of the AND circuit A1 and a low frequency square wave signal PWM2 is inputted to the other input of the AND circuit A2.

The high frequency square wave signal HF is outputted from a high frequency oscillation circuit (not shown) such as an astable multivibrator to repeat high and low levels at a frequency ranging from 10 kHz to several tens of kHz.

The low frequency square wave signals PWM1 and PWM2 are outputted as two-value signals of a high level or low level from an output port of, e.g., a microcomputer (not shown) for color adjusting and dimming, to repeat high and low levels at a frequency ranging from, e.g., 100 Hz to several thousands of Hz, at which switching on and off is not perceivable by the human eye.

If the low frequency square wave signal PWM1 inputted to the AND circuit A1 is a high level, the switching element Q1 is turned on and off at a high frequency by the high frequency square wave signal HF. If the low frequency square wave signal PWM1 is a low level, the switching element Q1 is turned off. In the same way, if the low frequency square wave signal PWM2 inputted to the AND circuit A2 is a high level, the switching element Q2 is turned on and off at a high frequency by the high frequency square wave signal HF. If the low frequency square wave signal PWM2 is a low level, the switching element Q2 is turned off.

Accordingly, since the step-down chopper circuits 10 and 20 operate intermittently in accordance with the duties of the low frequency square wave signals PWM1 and PWM2, the average current flowing in each of the semiconductor light emitting elements 1 and 2 is individually controlled to adjust the brightness of each luminous color, thereby adjusting a mixed luminous color. Further, by simultaneously increasing or decreasing the duties of the low frequency square wave signals PWM1 and PWM2 while maintaining a constant duty ratio thereof, the brightness of each light emitting element may be increased or decreased while maintaining a constant luminous color.

Further, the smoothing capacitor C1 serving as an input DC power supply is charged with a DC voltage obtained by full-wave rectifying, e.g., an AC voltage of a commercial AC power source through a rectifier (not shown). A control power supply voltage Vcc of the control circuit including the AND circuits A1 and A2 and the like may be generated by connecting the smoothing capacitor C1 in parallel with a series circuit of a step-down resistor and a Zener diode for regulating a voltage. The same can be applied to other embodiments.

(Second Embodiment)

Figure 2:
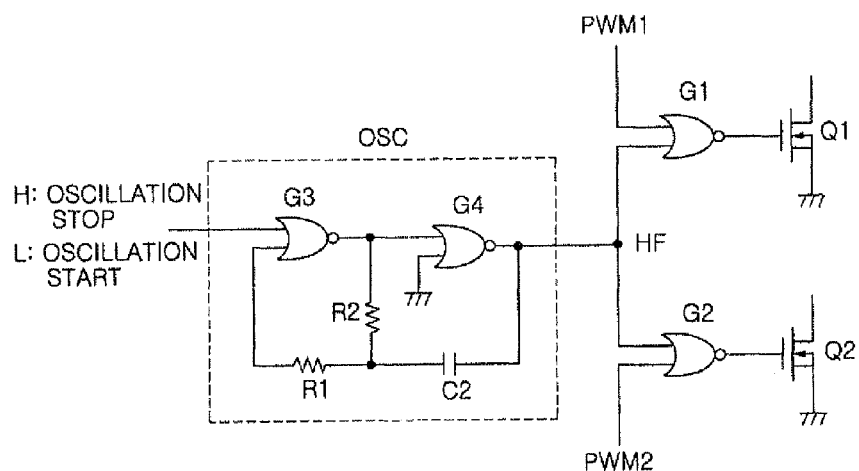
FIG. 2 is a circuit diagram showing a configuration of a principal part of a second embodiment of the present invention.

FIG. 2 is a circuit diagram showing a configuration of a principal part of a second embodiment of the present invention. The configuration of a main circuit may be same as the one shown in FIG. 1. In this embodiment, output signals of NOR circuits G1 and G2 serving as gate circuits instead of the AND circuits A1 and A2 shown in FIG. 1 are respectively inputted to the control electrodes of the switching elements Q1 and Q2. The high frequency square wave signal HF is inputted to one input of each of NOR circuits G1 and G2. The low frequency square wave signal PWM1 is inputted to the other input of the NOR circuit G1, and the low frequency square wave signal PWM2 is inputted to the other input of the NOR circuit G2.

A circuit surrounded by a dotted line in FIG. 2 is a high frequency oscillation circuit OSC which generates the high frequency square wave signal HF. The high frequency oscillation circuit OSC is configured by externally connecting resistors R1 and R2 and a capacitor C2 to NOR circuits G3 and G4 cascaded to each other. One input of the NOR circuit G3 is a control input of the oscillation stop or oscillation start. The other input of the NOR circuit G3 is connected to one terminal of each of the resistor R2 and the capacitor C2 through the resistor R1. The other terminal of the capacitor C2 is connected to an output of the NOR circuit G4. The other terminal of the resistor R2 is connected to an output of the NOR circuit G3 and one input of the NOR circuit G4. The other input of the NOR circuit G4 is fixed at a low level.

The high frequency oscillation circuit OSC has an oscillation stop state when the one input of the NOR circuit G3 is a high level input. For example, when an abnormality detection circuit (not shown) detects an abnormality, the one input of the NOR circuit G3 is set to a high level, so that the output of the NOR circuit G3 becomes a low level output all the time. Accordingly, the output of the NOR circuit G4 becomes a high level output all the time. Accordingly, since the outputs of the NOR circuits G1 and G2 become low level outputs all the time, the switching elements Q1 and Q2 maintain an OFF state.

When the high frequency oscillation circuit OSC has an oscillation stop state, the output of the NOR circuit G4 is a high level output and the output of the NOR circuit G3 is a low level output, so that a potential at a connection node between the capacitor C2 and the resistor R2 becomes a low level potential.

Then, when the one input of the NOR circuit G3 is set to a low level, the high frequency oscillation circuit OSC oscillates to generate the high frequency square wave signal HF determined by a time constant of the capacitor C2 and the resistor R2. Since the other input of the NOR circuit G3 connected to the capacitor C2 through the resistor R1 has a high impedance, charge and discharge of the capacitor C2 are carried out through the resistor R2.

The oscillation operation due to charging and discharging of the capacitor C2 will be described. When the one input of the NOR circuit G3 becomes a low level input, the output of the NOR circuit G3 is inverted to a high level, and the output of the NOR circuit G4 is also inverted to a low level. Accordingly, the potential of the connection node between the capacitor C2 and the resistor R2 is further reduced and, therefore, the output of the NOR circuit G3 is maintained at a high level.

Then, the current flows in a path including the high level output of the NOR circuit G3→the resistor R2→the capacitor C2→the low level output of the NOR circuit G4. Accordingly, the potential at the connection node between the capacitor C2 and the resistor R2 increases. When the input voltage of the NOR circuit G3 detected through the resistor R1 exceeds a threshold voltage (generally Vcc/2), the output of the NOR circuit G3 is inverted to a low level, and the output of the NOR circuit G4 is inverted to a high level. Accordingly, the potential at the connection node between the capacitor C2 and the resistor R2 further increases and, therefore, the output of the NOR circuit G3 is maintained at a low level.

Then, the current flows in a path including the high level output of the NOR circuit G4→the capacitor C2→the resistor R2→the low level output of the NOR circuit G3. Accordingly, the potential at the connection node between the capacitor C2 and the resistor R2 gradually decreases. When the input voltage of the NOR circuit G3 detected through the resistor R1 becomes lower than a threshold voltage (generally Vcc/2), the output of the NOR circuit G3 is inverted to a high level, and the output of the NOR circuit G4 is inverted to a low level. Thereafter, the same operation is repeated.

In the second embodiment, the oscillation frequency of the high frequency oscillation circuit OSC is determined by a charging and discharging time constant of the capacitor C2 and the resistor R2. The on/off duty of the oscillated high frequency square wave signal HF becomes almost 50%.

In the main circuit shown in FIG. 1, in a case where a ratio of the power supply voltage (voltage across the smoothing capacitor C1) to the load voltage (voltage across the semiconductor light emitting elements 1 and 2) is 2:1, the voltage (=power supply voltage−load voltage) applied to the inductors L1 and L2 when the switching elements Q1 and Q2 are turned on becomes equal to the voltage (=load voltage) applied to the inductors L1 and L2 when the switching elements Q1 and Q2 are turned off. Accordingly, when the on/off duty of the high frequency square wave signal HF is 50% as in the control circuit shown in FIG. 2, a zero-cross switching operation is smoothly performed.

In the main circuit shown in FIG. 1, in a case where the load voltages (voltage across the semiconductor light emitting elements 1 and 2) are larger than ½ of the power supply voltage (voltage across the smoothing capacitor C1), the voltages (=power supply voltage−load voltage) applied to the inductors L1 and L2 when the switching elements Q1 and Q2 are turned on become smaller than the voltages (=load voltage) applied to the inductors L1 and L2 when the switching elements Q1 and Q2 are turned off. Accordingly, an increasing rate of the each of currents flowing through the inductors L1 and L2 becomes lower than a corresponding decreasing rate thereof. Thus, when the on/off duty of the high frequency square wave signal HF is 50% as in the control circuit shown in FIG. 2, there is performed a switching operation of a discontinuous mode wherein energies of the inductors L1 and L2 are completely discharged whenever the on/off switching is performed.

In the main circuit shown in FIG. 1, in a case where the load voltages (voltage across the semiconductor light emitting elements 1 and 2) are smaller than ½ of the power supply voltage (voltage across the smoothing capacitor C1), the voltages (=power supply voltage−load voltage) applied to the inductors L1 and L2 when the switching elements Q1 and Q2 are turned on become larger than the voltages (=load voltage) applied to the inductors L1 and L2 when the switching elements Q1 and Q2 are turned off. Accordingly, an increasing rate of each of the currents flowing in the inductors L1 and L2 becomes higher than a corresponding decreasing rate thereof. Thus, when the on/off duty of the high frequency square wave signal HF is 50% as in the control circuit shown in FIG. 2, there is performed a switching operation of a continuous mode wherein the switching elements Q1 and Q2 are turned on before the energies of the inductors L1 and L2 are completely discharged.

In the switching operation of a continuous mode, since the discharge of energies of the inductors is not completed, more energy is accumulated in the inductors by turning on the switching elements of the next cycle. Accordingly, it is required to set a stop period of an intermittent operation of the switching elements such that the inductors are not magnetically saturated.

In view of the above, the control circuit shown in FIG. 2 is particularly appropriate when the load voltages (voltage across the semiconductor light emitting elements 1 and 2) are equal to or larger than ½ of the power supply voltage (voltage across the smoothing capacitor C1) in the main circuit shown in FIG. 1. If the load voltages are equal to or larger than ½ of the power supply voltage, the energies accumulated in the inductors L1 and L2 when the switching elements Q1 and Q2 are turned on are rapidly discharged when the switching elements Q1 and Q2 are turned off even in the case where the on/off duty of the high frequency square wave signal HF is 50% as in the control circuit shown in FIG. 2. Therefore, the energies of the inductors L1 and L2 are completely discharged when the switching elements Q1 and Q2 of the next cycle are turned on and, thus, the inductors L1 and L2 are not magnetically saturated even though the peak current control circuit of JP2002-203988 supra is omitted in the circuit of FIG. 2. Accordingly, it is possible to greatly simplify the configuration of the control circuit.

Further, the NOR circuits G1 to G4 of the second embodiment may be implemented at a low cost by using a general-purpose logic integrated circuit (IC) in which four logic elements are embedded in one chip. The same can be applied to a third embodiment.

(Third Embodiment)

Figure 3:
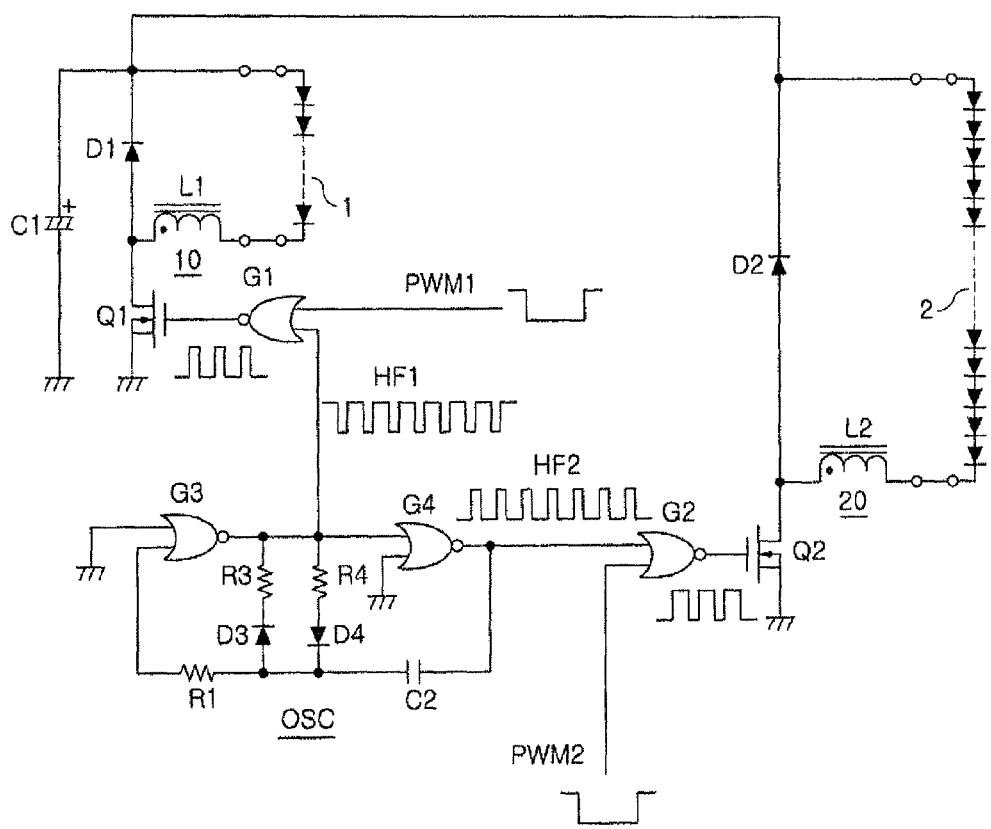
FIG. 3 is a circuit diagram in accordance with a third embodiment of the present invention.

FIG. 3 is a circuit diagram in accordance with the third embodiment of the present invention. In this embodiment, the load voltage of the first semiconductor light emitting element 1 is different from the load voltage of the second semiconductor light emitting element 2. For example, in a case where the load voltage of the first semiconductor light emitting element 1 is lower than ½ of the power supply voltage, and the load voltage of the second semiconductor light emitting element 2 is higher than ½ of the power supply voltage, it is preferable that the ON time of the switching element Q1 of the first step-down chopper circuit 10 driving the former is set to be shorter than the OFF time thereof, and the ON time of the switching element Q2 of the second step-down chopper circuit 20 driving the latter is set to be longer than the OFF time thereof.

Specifically, in the circuit shown in FIG. 3, the resistor R2 for setting an oscillation frequency in the high frequency oscillation circuit OSC shown in FIG. 2 is replaced with a parallel circuit including a series circuit of a resistor R3 and a diode D3 and a series circuit of a resistor R4 and a diode D4, and a charging and discharging time constant of the capacitor C2 is set to be unbalanced. Accordingly, the circuit shown in FIG. 3 is configured to oscillate to generate high frequency square wave signals HF1 and HF2 having different on/off duties, provide the square wave signal HF1 outputted from the NOR circuit G3 to the switching element Q1 via the NOR circuit G1, and provide the square wave signal HF2 outputted from the NOR circuit G4 to the switching element Q2 via the NOR circuit G2.

As one example, in a case where the load voltage of the first semiconductor light emitting element 1 is ¼ of the power supply voltage, the voltage applied to the inductor L1 when the switching element Q1 is turned on becomes ¾ of the power supply voltage, and the voltage applied to the inductor L1 when the switching element Q1 is turned off becomes ¼ of the power supply voltage. Accordingly, if a ratio of the ON time to the OFF time of the switching element Q1 is 1:3, the first step-down chopper circuit 10 performs a zero-cross switching operation.

Further, as another example, in a case where the load voltage of the second semiconductor light emitting element 2 is ¾ of the power supply voltage, the voltage applied to the inductor L2 when the switching element Q2 is turned on becomes ¼ of the power supply voltage, and the voltage applied to the inductor L2 when the switching element Q2 is turned off becomes ¾ of the power supply voltage. Accordingly, if a ratio of the ON time to the OFF time of the switching element Q2 is 3:1, the second step-down chopper circuit 20 performs a zero-cross switching operation.

In this case, the on/off duty of the first square wave signal HF1 outputted from the high frequency oscillation circuit OSC is set to be 3:1, and the on/off duty of the second square wave signal, HF2 obtained by inverting the first square wave signal HF1 is set to be 1:3. Then, the first and second square wave signals HF1 and HF2 are supplied to the switching elements Q1 and Q2 via the NOR circuits G1 and G2, respectively. Accordingly, both the first and second step-down chopper circuits 10 and 20 perform a zero-cross switching operation.

Further, since there can be a variation in the load voltages of the semiconductor light emitting elements 1 and 2 or the on/off duties of the high frequency square wave signals HF1 and HF2, a complete zero-cross switching operation may not be performed. Accordingly, if the load voltage (the number of the LEDs connected in series) of each of the semiconductor light emitting elements 1 and 2 is set to be slightly larger than that under the conditions of the zero-cross switching operation, the energy discharge times of the inductors L1 and L2 when the switching elements Q1 and Q2 are turned off become slightly shortened and, thus, it is possible to perform a switching operation of a discontinuous mode close to the zero-cross switching operation.

The third embodiment is different from the second embodiment in that, although the oscillation of the high frequency oscillation circuit OSC is stopped, the switching elements Q1 and Q2 cannot be turned off at the same time. However, the switching elements Q1 and Q2 can be turned off at the same time by setting the low frequency square wave signals PWM1 and PWM2 to have a high level simultaneously.

Further, the third embodiment has an additional effect in that the ripple of the smoothing capacitor C1 serving as an input DC power supply can be reduced since the switching elements Q1 and Q2 are not turned on at the same time. The same effect can be obtained in fourth and fifth embodiments.

(Fourth Embodiment)

Figure 4:
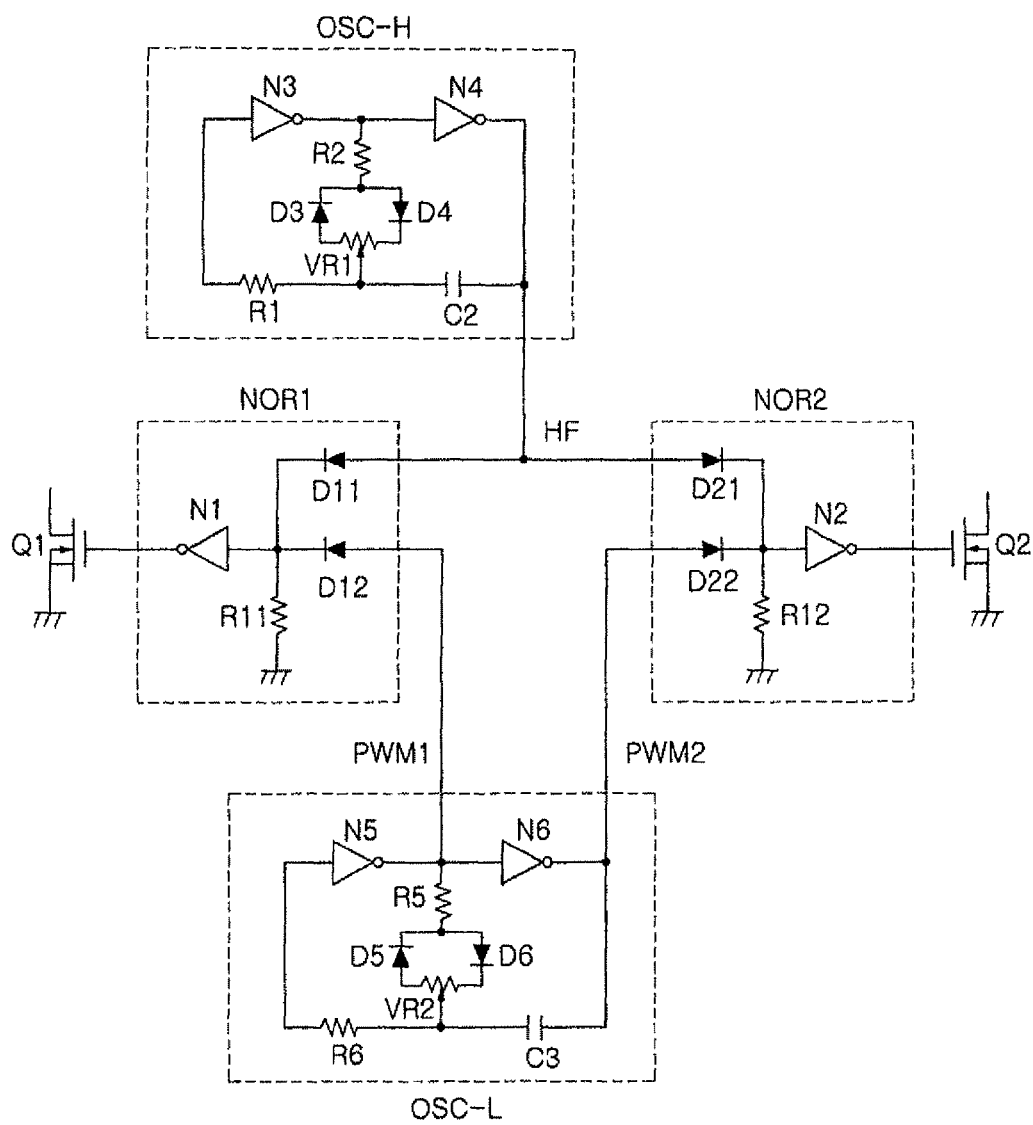
FIG. 4 is a circuit diagram showing a configuration of a principal part of a fourth embodiment of the present invention.

FIG. 4 illustrates a configuration of the control circuit in accordance with the fourth embodiment of the present invention. The configuration of a main circuit may be same as that of FIG. 1. In this embodiment, output signals of inverter circuits N1 and N2 are respectively inputted to the control electrodes of the switching elements Q1 and Q2.

The inverter circuit N1 forms a first NOR circuit NOR1 together with a diode OR circuit including diodes D11 and D12 and a resistor R11. The inverter circuit N2 forms a second NOR circuit NOR2 together with a diode OR circuit including diodes D21 and D22 and a resistor R12.

The high frequency square wave signal HF outputted from a high frequency oscillation circuit OSC-H and the low frequency square wave signals PWM1 and PWM2 outputted from a low frequency oscillation circuit OSC-L are inputted to the first and second NOR circuits NOR1 and NOR2. In this embodiment, the on/off duties of the low frequency square wave signals PWM1 and PWM2 are complementarily changed. For example, if the high level period of the square wave signal PWM1 becomes long, the high level period of the square wave signal PWM2 is reduced. The same can be applied to the opposite case and the low level period.

The high frequency oscillation circuit OSC-H functions as a dimming control circuit for changing the brightness, and the low frequency oscillation circuit OSC-L functions as a color-adjusting control circuit for changing the color temperature.

The high frequency oscillation circuit OSC-H is configured by externally connecting the resistors R1 and R2, a variable resistor VR1, diodes D3 and D4 and a capacitor C2 to the inverter circuits N3 and N4. By adjusting the position of a wiper (sliding contact) of the variable resistor VR1, it is possible to make the on/off duty of the high frequency square wave signal HF larger or smaller than 50%.

The low frequency oscillation circuit OSC-L is configured by externally connecting resistors R5 and R6, a variable resistor VR2, diodes D5 and D6 and a capacitor C3 to the inverter circuits N5 and N6. By adjusting the position of a wiper of the variable resistor VR2, it is possible to make the on/off duty of the low frequency square wave signal PWM1 larger or smaller than 50%. In this case, the on/off duty of the low frequency square wave signal PWM2 becomes 100−(on/off duty of the low frequency square wave signal PWM1) %.

For example, if the switching element Q1 controls the current flowing in the semiconductor light emitting element 1 having a luminous color of a cold color and the switching element Q2 controls the current flowing in the semiconductor light emitting element 2 having a luminous color of a warm color, and the currents flowing in the semiconductor light emitting elements 1 and 2 are balanced, a mixed color becomes a luminous color of a neutral white color. Further, if the current flowing in the semiconductor light emitting element 1 is larger than the current flowing in the semiconductor light emitting element 2, it exhibits a luminous color of a bluish white color. In opposite case, it exhibits a luminous color of a reddish white color. Accordingly, it is possible to achieve color temperatures such as a daylight color, a noon-light color and a light bulb color, which are widely used in the field of a fluorescence lamp.

In this embodiment, since the on/off duties of the low frequency square wave signals PWM1 and PWM2 are complementarily changed, the entire brightness cannot be changed by the on/off duty of the low frequency oscillation circuit OSC-L. Accordingly, ON pulse widths of the switching elements Q1 and Q2 are changed by varying the on/off duty of the high frequency square wave signal HF outputted from the high frequency oscillation circuit OSC-H, thereby achieving a dimming operation.

In this embodiment, the inverter circuits N1 to N6 can be implemented at a low cost by using a general-purpose logic IC in which six logic elements are embedded in one chip.

(Fifth Embodiment)

Figure 5:
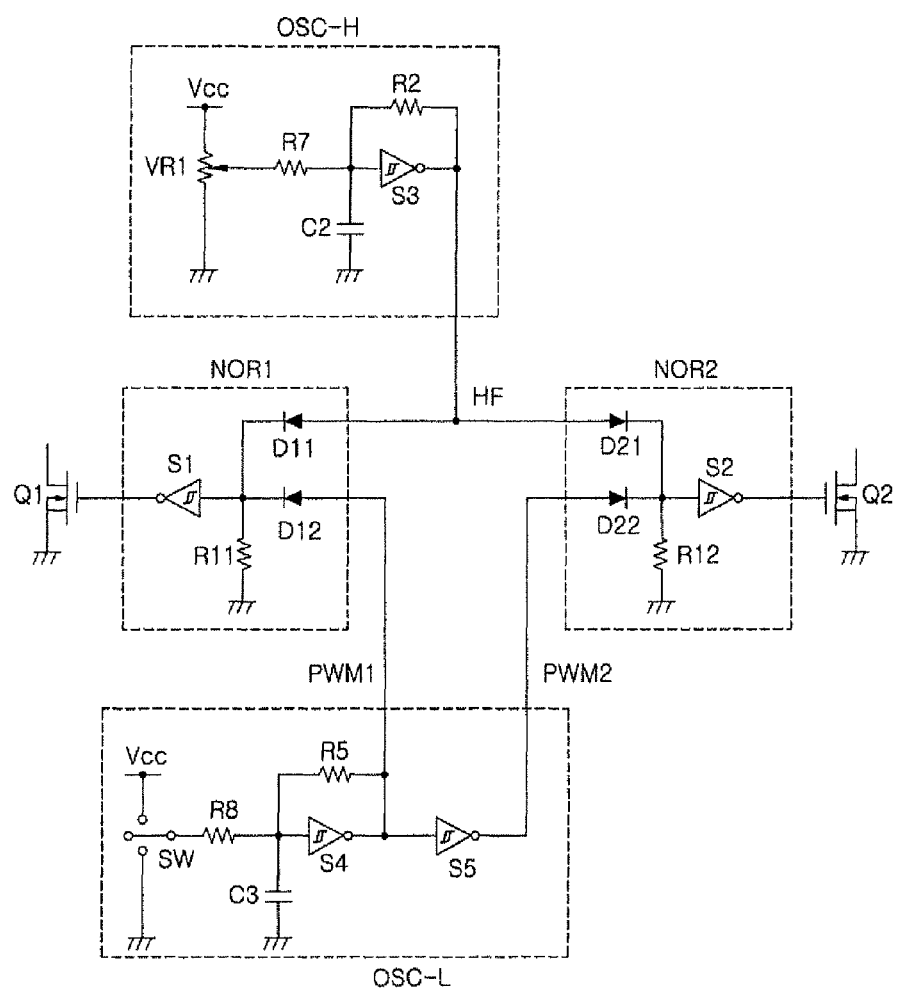
FIG. 5 is a circuit diagram showing a configuration of a principal part of a fifth embodiment of the present invention.

FIG. 5 illustrates a configuration of a control circuit in accordance with the fifth embodiment of the present invention. A main circuit may have the same configuration as that of FIG. 1. In this embodiment, output signals of Schmitt inverter, circuits S1 and S2 are respectively inputted to the control electrodes of the switching elements Q1 and Q2.

In comparison with the fourth embodiment, the configurations of the high frequency oscillation circuit OSC-H and the low frequency oscillation circuit OSC-L are different. Since the Schmitt inverter circuits used in this embodiment have hysteresis characteristics in a threshold value of the input voltage, an oscillation circuit can be obtained by a single device.

The configuration and operation of the low frequency oscillation circuit OSC-L will be described. The resistor R5 for setting an oscillation frequency is connected between an input terminal and an output terminal of a Schmitt inverter circuit S4.

The capacitor C3 for setting the oscillation frequency is connected between the input terminal of the Schmitt inverter circuit S4 and the circuit ground. A time constant of the capacitor C3 and the resistor R5 is set to oscillate the low frequency square wave signal PWM1. The on/off duty of the second square wave signal PWM2 obtained by logically inverting the output of the Schmitt inverter circuit S4 via the Schmitt inverter circuit S5 is complementarily changed with respect to the on/off duty of the first square wave signal PWM1.

Since the voltage across the capacitor C3 is low when the power is turned on, the output of the Schmitt inverter circuit S4 becomes a high level output. Accordingly, the charging current flows in the capacitor C3 through the resistor R5 and the voltage across the capacitor C3 gradually increases. If the voltage across the capacitor C3 becomes higher than the upper threshold value of the Schmitt inverter circuit S4, the output of the Schmitt inverter circuit S4 is inverted to a low level. Accordingly, the electric charges accumulated in the capacitor C3 are discharged through the resistor R5 and the voltage across the capacitor C3 gradually decreases. If the voltage across the capacitor C3 becomes lower than the lower threshold value of the Schmitt inverter circuit S4, the output of the Schmitt inverter circuit S4 is inverted to a high level. Thereafter, the same operation is repeated, and the output of the Schmitt inverter circuit S4 alternately repeats high and low levels at an oscillation frequency determined by a time constant of the capacitor C3 and the resistor R5.

Generally, there is a hysteresis of about 20% of the control power supply voltage Vcc between the upper threshold value and the lower threshold value of the Schmitt inverter circuit S4. Therefore, if the upper threshold value is 0.6×Vcc, the lower threshold value becomes 0.4×Vcc, and the on/off duty becomes almost 50%.

The above operation is performed when a duty conversion switch SW is set at a position shown in FIG. 5. However, if the duty conversion switch SW is changed to another position, it is possible to make the on/off duty larger or smaller than 50%. The resistor R8 has one terminal connected to a connection node between the resistor R5 and the capacitor C3, and the other terminal of the resistor R8 can be connected to the potential of the control power supply voltage Vcc or the potential of the circuit ground by the duty conversion switch SW. If it is connected to the potential of the control power supply voltage Vcc, the capacitor C3 is charged fast but discharged slowly. If it is connected to the potential of the circuit ground, the capacitor C3 is discharged fast but charged slowly.

In view of the above, since the on/off duty of the low frequency oscillation circuit OSC-L can be converted into three steps, it is possible to achieve color temperatures such as a daylight color, a noonlight white color and a light bulb color, which are widely used in the field of a fluorescence lamp.

The configuration and operation of the high frequency oscillation circuit OSC-H are similar to those of the low frequency oscillation circuit OSC-L, except that the time constant of the resistor R2 and the capacitor C2 is set to oscillate to generate the high frequency square wave signal HF. Further, this embodiment is different in that a potentiometer for dividing a control power supply voltage Vcc is formed by the variable resistor VR1 and the potential at the division point is connected to the connection node between the resistor R2 and the capacitor C2 via the resistor R7 to continuously change the on/off duty of the high frequency square wave signal HF, thereby achieving a dimming operation for changing the brightness without changing the color temperature.

Further, the variable resistor VR1 and the conversion switch SW may be replaced with each other. In this case, it is possible to achieve stepwise dimming and continuous variation in color temperature. Further, if variable resistors are used for both the high frequency oscillation circuit OSC-H and the low frequency oscillation circuit OSC-L, it is possible to achieve continuous dimming and continuous variation in color temperature. If conversion switches are used for both the circuits, it is possible to achieve stepwise dimming and stepwise variation in color temperature.

The Schmitt inverter circuits 81 to S5 used in this embodiment can be implemented at a low cost by using a general-purpose logic IC in which six logic elements are embedded in one chip.

(Sixth Embodiment)

In the above-described first to fifth embodiments, the step-down chopper circuit has been described as an example of the switching power supply circuit, but it is not limited thereto. For example, a step-up and step-down chopper circuit, a flyback DC-DC converter circuit, a step-up chopper circuit or the like may be used as the switching power supply circuit. The switching power supply circuit of these examples includes an inductive element such as an inductor and a transformer, a switching element for opening/closing the current flowing in the inductive element from the input DC power supply at a high frequency, and a flyback diode for discharging the energy of the inductive element toward the load when the switching element is turned off. If the specific conditions are satisfied, a continuous mode is not set.

For example, in a case where the switching power supply circuit is a step-down chopper circuit, if a ratio of the ON time/OFF time of the switching element is equal to or smaller than a ratio of the load voltage/(power supply voltage−load voltage), a continuous mode is not set.

Further, in a case where the switching power supply circuit is a step-up and step-down chopper circuit or a flyback DC-DC converter circuit, if a ratio of the ON time/OFF time of the switching element is equal to or smaller than a ratio of the load voltage/power supply voltage, a continuous mode is not set.

Further, in a case where the switching power supply circuit is a step-up chopper circuit, if a ratio of the ON time/OFF time of the switching element is equal to or smaller than a ratio of the (load voltage−power supply voltage)/power supply voltage, a continuous mode is not set.

Accordingly, if the load voltage is large or the ON time is short to satisfy these conditions, the inductor is not magnetically saturated and it is unnecessary to provide the peak current control circuit described in JP2002-203988 even when any type of switching power supply circuit is used.

The peak current control circuit of JP2002-203988 is provided in order to prevent magnetic saturation of the inductor and also improve the constant current characteristics in an intermittent operation of the switching power supply circuit.

However, in a case where the semiconductor light emitting element is a series circuit of LEDs, the load voltage is almost constant. Accordingly, supposing that the power supply voltage is constant and the ON period of the switching element is determined, a peak value of the current flowing through the inductor when the switching element is turned on is uniquely determined. Further, if the peak value of the current flowing through the inductor is determined, the load voltage is almost constant. Therefore, the time required for the discharge of energy of the inductor to be completed when the switching element is turned off is also uniquely determined. Accordingly, if the ON time of the switching element is set to regulate a peak value of the current flowing through the inductor and the OFF time of the switching element is set to be equal to or longer than the time required for the energy discharge of the inductor determined based on the load voltage, it is possible to independently control a plurality of types of switching power supply circuits by using a common high frequency oscillation circuit.

(Seventh Embodiment)

Figure 6:
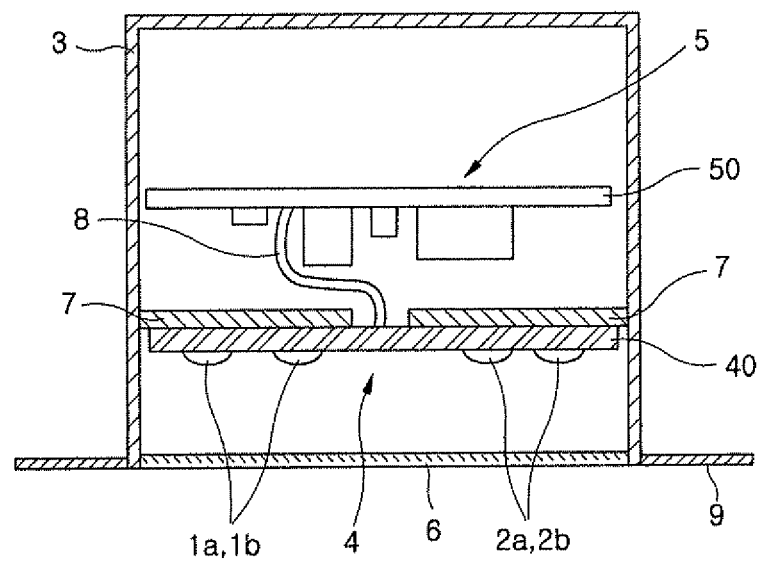
FIG. 6 is a cross-sectional view schematically showing a configuration of an illumination apparatus in accordance with a seventh embodiment of the present invention.

FIG. 6 is a cross-sectional view showing a power supply integrated LED illumination apparatus including an LED lighting device in accordance with the embodiments of the present invention.

A housing 3 of the LED illumination apparatus is buried in the ceiling 9. An LED module 4 and a power supply unit 5 are embedded in the housing 3. The housing 3 is formed of a cylindrical body made of metal and having an open bottom portion. The open bottom portion is covered with a light diffusion plate 6. The LED module 4 is arranged to face the light diffusion plate 6. Reference numeral 40 denotes an LED mount substrate on which LEDs 1a, 1b, . . . , 2a, 2b, of the LED module 4 are mounted.

The LEDs 1a, 1b, . . . are, e.g., LEDs of a cold color, and a series circuit of the LEDs 1a, 1b, . . . corresponds to the semiconductor light emitting element 1 of FIG. 1 or 3. The LEDs 2a, 2b, . . . are, e.g., LEDs of a warm color, and a series circuit of the LEDs 2a, 2b, . . . corresponds to the semiconductor light emitting element 2 of FIG. 1 or 3. Further, it is preferable to facilitate mixing of luminous colors by alternately arranging LEDs of a cold color and LEDs of a warm color in a circumferential direction on the LED mount substrate 40 having a circular plate shape.

Reference numeral 50 denotes a power supply circuit substrate on which electric parts of the power supply unit 5 are mounted. The LED module 4 is installed to be in contact with a heat radiation plate 7 in the housing 3 to release the heat generated by the LEDs 1a, 1b, . . . , 2a, 2b, into the housing 3. Further, the LED module 4 and the power supply unit 5 are connected to the lead wire 8 through a hole provided in the heat radiation plate 7. The heat radiation plate 7 is a metal plate such as an aluminum plate and a copper plate and provides not only a heat radiation effect but also a shielding effect. The heat radiation plate 7 is electrically connected to the housing 3 to be grounded. However, the heat radiation plate 7 includes a non-charging portion which is electrically isolated from the lead wire 8.

In the above-described embodiments, light emitting diodes have been described as the semiconductor light emitting element, but it is not limited thereto. For example, an organic electroluminescence (EL) device, semiconductor laser device or the like may be used as the semiconductor light emitting element.

While the invention has been shown and described with respect to the embodiments, it will be understood by those skilled in the art that various changes and modification may be made without departing from the scope of the invention as defined in the following claims.

What is claimed is:

1. A lighting device comprising:
    a first switching power supply circuit and a second switching power supply circuit which are connected in parallel to an input DC power supply to drive a first semiconductor light emitting element emitting a first light having a first color temperature and a second semiconductor light emitting element emitting a second light having a second color temperature which is different from the first color temperature;
    a high frequency oscillation circuit which generates a high frequency square wave signal serving as an on/off switching signal of each of the first switching power supply circuit and the second switching power supply circuit;
    a low frequency oscillation circuit which generates a first low frequency square wave signal and a second low frequency square wave signal;
    a first gate circuit connected to the first switching power supply circuit having a first input to which the high frequency square wave signal is inputted and a second input to which the first low frequency square wave signal is inputted; and
    a second gate circuit connected to the second switching power supply circuit having a first input to which the high frequency square wave signal is inputted and a second input to which the second low frequency square wave signal is inputted,
    wherein each of the first low frequency square wave signal and the second low frequency square wave signal has a frequency lower than that of the high frequency square wave signal,
    wherein the first gate circuit and the second gate circuit determine whether the high frequency square wave signal is supplied as the on/off switching signal to the first switching power supply circuit and the second switching power supply circuit based on the first low frequency square wave signal and the second low frequency square wave signal, respectively,
    wherein on/off duties of the first low frequency square wave signal and the second low frequency square wave signal are complementarily changed such that a color temperature of a mixed light of the first light and the second light is varied, and
    wherein a brightness of each of the first semiconductor light emitting element and the second semiconductor light emitting element is changed by adjusting an on/off duty of the high frequency square wave signal.

2. The lighting device of claim 1, wherein the lighting device includes an integrated circuit in which six logic circuits are embedded in one chip, and
    wherein two of the logic circuits serve as the first gate circuit and the second gate circuit, and the other logic circuits serve as the low frequency oscillation circuit and the high frequency oscillation circuit.

3. An illumination apparatus comprising:
    a first semiconductor light emitting element emitting a first light having a first color temperature;
    a second semiconductor light emitting element emitting a second light having a second color temperature which is different from the first color temperature; and
    a lighting device configured to drive the first semiconductor light emitting element and the second semiconductor light emitting element,
    wherein the lighting device includes a first switching power supply circuit and a second switching power supply circuit which are connected in parallel to an input DC power supply to drive the first semiconductor light emitting element and the second semiconductor light emitting element;
    a high frequency oscillation circuit which generates a high frequency square wave signal serving as an on/off switching signal of each of the first switching power supply circuit and the second switching power supply circuit;
    a low frequency oscillation circuit which generates a first low frequency square wave signal and a second low frequency square wave signal;
    a first gate circuit connected to the first switching power supply circuit having a first input to which the high frequency square wave signal is inputted and a second input to which the first low frequency square wave signal is inputted; and
    a second gate circuit connected to the second switching power supply circuit having a first input to which the high frequency square wave signal is inputted and a second input to which the second low frequency square wave signal is inputted,
    wherein each of the first low frequency square wave signal and the second low frequency square wave signal has a frequency lower than that of the high frequency square wave signal,
    wherein the first gate circuit and the second gate circuit determine whether the high frequency square wave signal is supplied as the on/off switching signal to the first switching power supply circuit and the second switching power supply circuit based on the first low frequency square wave signal and the second low frequency square wave signal, respectively,
    wherein on/off duties of the first low frequency square wave signal and the second low frequency square wave signal are complementarily changed such that a color temperature of a mixed light of the first light and the second light is varied, and
    wherein a brightness of each of the first semiconductor light emitting element and the second semiconductor light emitting element is changed by adjusting an on/off duty of the high frequency square wave signal.

4. The illumination apparatus of claim 3, wherein the lighting device includes an integrated circuit in which six logic circuits are embedded in one chip, and
    wherein two of the logic circuits serve as the first gate circuit and the second gate circuit, and the other logic circuits serve as the low frequency oscillation circuit and the high frequency oscillation circuit.

* * * * *